Oct. 9, 1956 G. W. BRUDERICK 2,765,673
MECHANICAL CONTROL UNIT

Filed May 11, 1955 2 Sheets—Sheet 1

INVENTOR.
GEORGE W. BRUDERICK

BY
ATTORNEY

Oct. 9, 1956  G. W. BRUDERICK  2,765,673
MECHANICAL CONTROL UNIT

Filed May 11, 1955  2 Sheets—Sheet 2

INVENTOR.
GEORGE W. BRUDERICK
BY
ATTORNEY

United States Patent Office 2,765,673
Patented Oct. 9, 1956

2,765,673

MECHANICAL CONTROL UNIT

George W. Bruderick, Detroit, Mich.

Application May 11, 1955, Serial No. 507,642

5 Claims. (Cl. 74—527)

This invention relates to locks and latches and more particularly to devices for locking a movable member and selecting the path of movement of both slidable and rotatable members.

Broadly the invention comprehends a mechanical control unit including means for locking a member against movement and for selecting the path of movement of the member.

An object of the invention is to provide a control unit for positively locking either a slidable or rotatable member against movement, for releasing the member for free movement between fixed limits and for selecting the path of movement of the member.

Another object of the invention is to provide a control unit which may be manually adjusted for control of either a slidable or rotatable member including means for sliding and/or rotating a member, means for locking the member against movement, means for freeing the member for movement in both directions, and means for restricting movement of the member to a selective path of movement.

An additional object of the invention is the provision of structure of the type hereinabove defined characterized in that it will be simple and inexpensive in construction, highly efficient in use, positive in action, durable in service and a general improvement in the art.

Other objects and advantages of the invention will more fully appear from the following description when taken in connection with the drawings.

Figure 1:
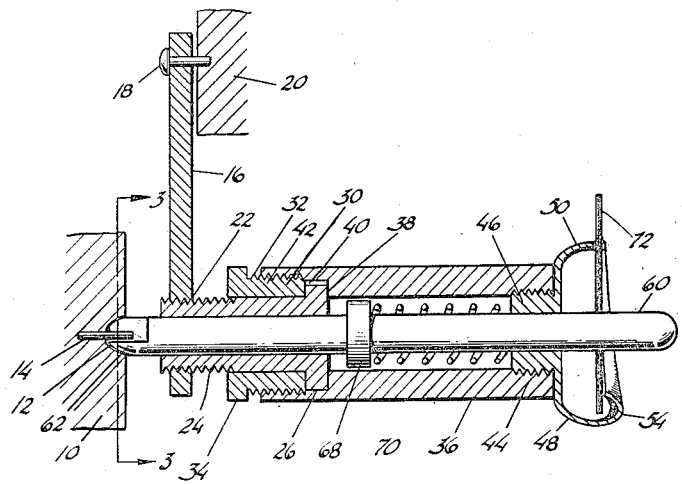
Figure 2:
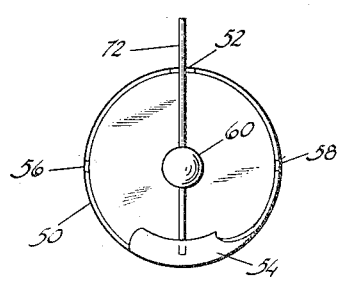
Figure 3:
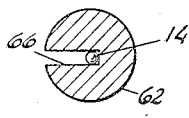
Figure 4:
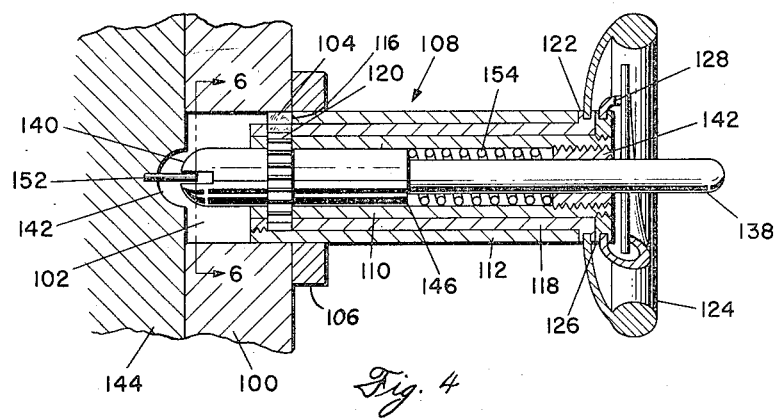
Figure 5:
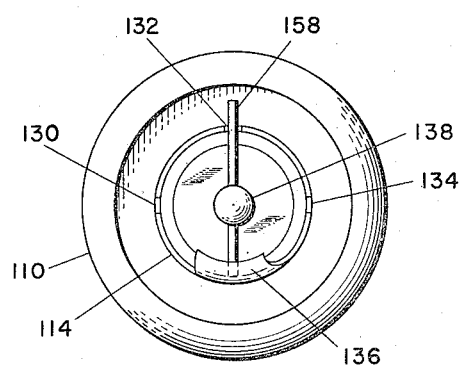
Figure 6:
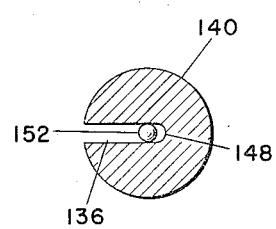

Figure 1 is a longitudinal sectional view of a control unit embodying the invention, Figure 2 is an end view, Figure 3 is a sectional view taken substantially on line 3—3 of Figure 1, Figure 4 is a longitudinal sectional view of a modification of the invention, Figure 5 is an end view of the modification, and Figure 6 is a sectional view taken substantially on line 6—6 of Figure 4.

Referring to the drawings for more specific details of the invention 10 indicates a fixed member, having a conical recess 12 and a pin 14 mounted in the bottom of the recess in concentric relation thereto and extended slightly beyond the member.

An arm 16 pivoted as at 18 to a movable member 20 swings over the member 10. The arm 16 has an opening 22 in the free end thereof and threaded in the opening is a nipple 24 having a circumferential flange 26. A short sleeve 30 slipped on the nipple 24 seats on the flange. The sleeve 30 has an external thread 32 and a circumferential flange 34 preferably having a hexagonal perimeter for the reception of a wrench.

A cylinder 36 has an internal shoulder 38 receiving the flange 26 on the nipple 24 and is splined to the flange 26 as at 40 to inhibit relative rotation, and threaded as indicated at 42 for the reception of the thread 32 on the sleeve 30 so that the cylinder may be adjusted longitudinally.

A plug 44 threaded in the free end of the cylinder 36 has an axial bore 46, the purpose of which will hereinafter appear, and a flange 48 having a cupped rim 50 provided with a notch 52. The edge of the rim 50 is inclined upwardly in both directions from the notch 52 to a lip 54 on the rim in oppositely disposed relation to the notch 52 and the edge of the rim 50 also has notches 56 and 58 arranged intermediate the notch 52 and the lip 54.

A plunger 60 reciprocable in the nipple 24 and plug 44 has a conical head 62 complementary to the recess 12 in the fixed member 10 and the head has a radially disposed slot 66 for the reception of the pin 14 in the bottom of the recess, and for ingress and egress of the pin. The plunger also has a collar 68 and a coil spring 70 sleeved on the plunger between the collar 68 and the plug 44 serves to urge the plunger forwardly and a lever 72 extended diametrically through the plunger and beyond serves as a latch for cooperation with the notches 52, 56 and 58 in the rim 50 and the latch 74 cooperates with the lip 54 to retain the plunger in adjusted position.

In a normal operation, when it is desired to lock the movable member in a fixed position, the lever 72 is moved into the notch 52 with one end thereof beneath the lip 54 wherein the conical head on the plunger seats tightly in the conical recess 12 with the pin 14 in the bottom of the slot 66 and thus the member 16 is held against movement.

The path of movement of the member is selective. In instances where it is desired that the member may be moved in a path to either side of the locked position the lever 72 is shifted from the notch 52 into either the notch 56 or 58 according to the path selected, and in so shifting the lever it rides on the inclined rim 50 and extracts the head 62 of the plunger 60 from the recess 12 and when the lever is received by either of the notches 56 or 58 the plunger 60 has turned through an angle of ninety degrees and during this movement of the plunger the slot 66 is positioned to face the path selected so that the pin may be free to move from the slot or the arm swing free of the pin, and in instances where it is desired that the member be free to move in either direction or the lever swing in either direction the lever is shifted to position one end thereof on top of the lip 54; this movement of the lever extracts the plunger to a degree that it is free of the pin.

A modification of the invention is shown in Figures 4, 5 and 6. In this embodiment of the invention a slidable member 100 has a slot 102 and the slidable member carries a rack 104.

A stationary member 106 supports a dual sleeve indicated generally at 108 including concentrically disposed inner and outer sleeve sections 110 and 112 connected at one end to provide an annular chamber 114 and cut-away as at 116.

A hollow shaft 118 mounted for rotation in the chamber 114 has on one end a gear 120 accessible through the cut-away portion 116 and in mesh with the rack 104, and the other end of the shaft has a flange 122 supporting a hand wheel 124.

The inner sleeve section 110 has thereon a flange 126 supporting an upturned inclined rim 128 having spaced notches 130, 132 and 134 and a lip 136.

A plunger 138 reciprocal in the sleeve section 110 has a conical head 140 received by a conical recess 142 in a fixed support 144, and a shoulder 146. The head 140 has a concentrically disposed pocket 148 and a radial slot 150 for the reception of a pin 152 positioned in the conical recess 142 in the fixed support in axial alignment with the plunger. A coil spring 154 sleeved on the plunger 138 and seated on the shoulder 146 abuts a plug 156 threaded in the sleeve, and a hand lever 158 extended diametrally through the plunger 138 cooperates with the notches 130, 132 and 134 for adjustment of the plunger.

The operation of this modified structure is the same as that of the preferred embodiment with the exception that the shaft 118 may be rotated by the wheel to drive the pinion engaging the rack 104 so as to shift the movable member 100.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the invention what I claim as new and desire to secure by Letters Patent, is:

1. A control unit comprising a movable member, a fixed support having a recess extended beyond the support, a pin in the recess, a spring pressed plunger, a head on the plunger complementary to the recess having a radial slot for the reception of the pin and means for retracting and rotating the plunger.

2. A control unit comprising a movable member, a fixed member having a recess extended beyond the fixed member, a pin in the recess, a plunger carried by the movable member, a head on the plunger complementary to the recess, a radial slot in the head for reception of the pin, a spring on the plunger urging the head into the recess, and means for retracting and rotating the plunger.

3. A control unit comprising, a fixed member having a recess and a pin in the recess extended beyond the fixed member, a movable member having a longitudinal slot receiving the pin, a rack carried by the movable member, a fixed support, a dual sleeve secured to the fixed support including inner and outer sleeve sections, a hollow shaft rotatable between the sections, a pinion on the shaft in mesh with the rack, a spring pressed plunger, a head on the plunger complementary to the recess in the fixed member having a slot for the reception of the pin, a rim on the hollow piston having spaced notches, and a lever extended through the plunger for cooperation with the notches.

4. A control unit comprising a fixed member having a recess and a pin in the recess extended beyond the member, a movable member slidable on the fixed member having a slot receiving the pin, a rack on the movable member extended into the slot, a fixed support arranged in parallel relation to the movable member, a dual sleeve secured to the fixed support having inner and outer sleeve sections, a hollow shaft between the sections, a pinion on the shaft in mesh with the rack, means for rotating the shaft, a spring pressed plunger in the inner sleeve section, a head on the plunger received by the recess in the fixed support having a radial slot receiving the pin, an upturned rim on the hollow piston having spaced notches, a lip on the rim, and a lever extended through the plunger cooperating with the notches and lip.

5. A control unit comprising a fixed member having a recess and a pin in the recess extended beyond the fixed member, a movable member slidable on the fixed member having a longitudinal slot receiving the pin, a rack on the movable member extended into the slot, a fixed support arranged in parallel relation to the fixed member and the movable member, a dual sleeve including inner and outer sleeve sections secured to the fixed support, a hollow shaft mounted for rotation between the inner and outer sections of the dual sleeve, a pinion on the shaft in mesh with the rack, a hand wheel on the shaft, a spring pressed plunger in the inner section, a head on the plunger receivable by the recess in the fixed member having a radial slot for the reception of the pin, a rim on the inner section of the dual sleeve, an inclined edge on the rim having spaced notches, a lip on the rim and a lever extended through the plunger cooperating with the notches and lip.

References Cited in the file of this patent

UNITED STATES PATENTS

| | | |
|---|---|---|
| 574,517 | Berry | Jan. 5, 1897 |
| 1,200,260 | Still | Oct. 3, 1916 |
| 1,588,490 | Murray | June 15, 1926 |
| 2,064,830 | Hanson | Dec. 22, 1936 |